(12) United States Patent
Mori et al.

(10) Patent No.: US 11,529,578 B2
(45) Date of Patent: Dec. 20, 2022

(54) EXHAUST GAS PURIFICATION FILTER

(71) Applicant: HONDA MOTOR CO., LTD., Tokyo (JP)

(72) Inventors: Takeshi Mori, Tokyo (JP); Tomoko Tsuyama, Tokyo (JP); Takayuki Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/647,732

(22) Filed: Jan. 11, 2022

(65) Prior Publication Data
US 2022/0226760 A1 Jul. 21, 2022

(30) Foreign Application Priority Data
Jan. 18, 2021 (JP) .............................. JP2021-006008

(51) Int. Cl.
*F01N 3/022* (2006.01)
*B01D 46/00* (2022.01)
(Continued)

(52) U.S. Cl.
CPC ....... *B01D 46/0027* (2013.01); *B01D 46/247* (2013.01); *B01D 46/2429* (2013.01); *B01D 46/24492* (2021.08); *B01D 53/945* (2013.01); *B01D 53/9454* (2013.01); *B01J 29/06* (2013.01); *B01J 35/04* (2013.01);
(Continued)

(58) Field of Classification Search
CPC .......... B01D 46/2429; B01D 46/24492; B01D 46/247; B01D 53/945; B01D 2279/30; B01J 29/06; B01J 35/04; B01J 37/0248; B01J 23/63; F01N 3/0222; F01N 3/035; F01N 3/2828; F01N 2330/06; F01N 2330/60; F01N 2370/04; F01N 2510/063;
(Continued)

(56) References Cited

U.S. PATENT DOCUMENTS 7,981,375 B2 * 7/2011 Ramberg ............ F02D 41/1406
264/630
2002/0178707 A1 * 12/2002 Vance ..................... C04B 38/06
55/523
(Continued)

FOREIGN PATENT DOCUMENTS

JP 2018537265 A 12/2018
WO 2017056067 A1 4/2017

*Primary Examiner* — Tom P Duong
(74) *Attorney, Agent, or Firm* — CKC & Partners Co., LLC (57) ABSTRACT

To provide an exhaust gas purification filter having a high capability of collecting particulate matter. The exhaust gas purification filter includes a filter base material having a wall flow structure and an exhaust gas purification catalyst. A wash coating amount of the exhaust gas purification catalyst ranges from 60 to 110 g/L or less. When the exhaust gas purification filter is divided into an upstream part, a middle part, and a downstream part, and average values of catalyst area ratios of the exhaust gas purification catalyst supported by surfaces of the partition walls are acquired at predetermined locations in cells on an inflow side and cells on an outflow side, a minimum value, among the average values, is 28% or greater. A maximum value, among sizes of pores in the partition walls after the exhaust gas purification catalyst is supported, is 14.6 μm or less.

6 Claims, 6 Drawing Sheets

(51) Int. Cl.
*B01J 35/04* (2006.01)
*B01D 46/24* (2006.01)
*F01N 3/035* (2006.01)
*F01N 3/28* (2006.01)
*B01D 53/94* (2006.01)
*B01J 29/06* (2006.01)

(52) U.S. Cl.
CPC ........... *F01N 3/0222* (2013.01); *F01N 3/035* (2013.01); *F01N 3/2828* (2013.01); *B01D 2255/1023* (2013.01); *B01D 2255/1025* (2013.01); *B01D 2255/2065* (2013.01); *B01D 2279/30* (2013.01); *F01N 2330/06* (2013.01); *F01N 2330/60* (2013.01); *F01N 2370/04* (2013.01); *F01N 2510/063* (2013.01)

(58) Field of Classification Search
CPC .... F01N 2370/02; F01N 3/021; F01N 13/009; Y02T 10/12
USPC .......................................................... 55/523
See application file for complete search history.

(56) References Cited

U.S. PATENT DOCUMENTS

| | | | |
|---|---|---|---|
| 2003/0176280 A1* | 9/2003 | Caze | C10G 45/04 502/439 |
| 2007/0119135 A1* | 5/2007 | Miao | B01D 39/2068 55/523 |
| 2009/0274867 A1* | 11/2009 | Hiramatsu | F01N 3/0222 428/116 |
| 2010/0234206 A1* | 9/2010 | Miao | B01D 39/2068 501/83 |
| 2011/0212007 A1* | 9/2011 | Lu | B01J 37/0018 977/700 |
| 2014/0061981 A1* | 3/2014 | Yamaguchi | B01D 39/2068 264/610 |
| 2014/0134063 A1* | 5/2014 | Gabrielsson | B01J 29/85 502/100 |
| 2017/0274366 A1* | 9/2017 | Teranishi | F01N 3/021 |
| 2019/0203621 A1* | 7/2019 | Seki | F01N 3/2828 |

* cited by examiner

FIG. 11 ized from Japanese Patent Application No. 2021-006008, filed on 18 Jan. 2021, the content of which is incorporated herein by reference.

BACKGROUND OF THE INVENTION

Field of the Invention

The present invention relates to an exhaust gas purification filter including an exhaust gas purification catalyst.

Related Art

Conventionally, direct injection gasoline engines have been actively employed as gasoline engines mounted on vehicles such as cars, from a viewpoint of improving combustion efficiency. However, such direct injection gasoline engines discharge particulate matter (PM) and other substances greater in amount, compared with port injection (PI) engines. Therefore, along with stricter emission regulations in recent years (PM emission regulations and PN (number of fine particles to be discharged) regulations), such technologies have been studied that provide an exhaust gas purification filter (such as a gasoline particulate filter, which will be hereinafter referred to as "GPF") configured to collect particulate matter in a pathway for exhaust gas from a gasoline engine.

A GPF is a filter base material in which a plurality of cells each extending from an end face on an inflow side for exhaust gas to an end face on an outflow side are partitioned and formed by partition walls made of a porous material, and the cells on the inflow side, where openings at the end faces on the outflow side are sealed, and the cells on the outflow side, where openings at the end faces on the inflow side are sealed, are alternately disposed.

In addition, such a gasoline engine is provided, on its exhaust pathway, with a three way catalyst (hereinafter referred to as "TWC") configured to purify CO, HC, and NOx contained in exhaust gas in a supported manner by a honeycomb supporting body. The TWC and the GPF are disposed in series on an exhaust route.

Note herein that it has also been studied that such a TWC is further supported by such a GPF as described above, and the GPF is given a three way purification function, in addition to the capability of collecting particulate matter (for example, see Japanese Unexamined Patent Application (Translation of PCT Application), Publication No. 2018-537265).

Patent Document 1: Japanese Unexamined Patent Application (Translation of PCT Application), Publication No. 2018-537265

SUMMARY OF THE INVENTION

In Japanese Unexamined Patent Application (Translation of PCT Application), Publication No. 2018-537265, as for a layer thickness of the exhaust gas purification catalyst supported by the partition walls, the layer thickness increases in the exhaust directions. Specifically, the layer thickness continuously changes in the exhaust directions of the cells on the inflow side and the cells on the outflow side, and a maximum layer thickness is observed on an end side where the cells on the inflow side are opened and an end side where the cells on the outflow side are opened (to have an on-wall, wedge-shaped coating profile). As a result, the layer thickness of the exhaust gas purification catalyst is thinner at a middle part in the exhaust directions. Furthermore, in Japanese Unexamined Patent Application (Translation of PCT Application), Publication No. 2018-537265, it has not been studied how the exhaust gas purification catalyst supported by the partition walls affects the capability of collecting particulate matter.

In view of the issues described above, an object of the present invention is to provide an exhaust gas purification filter having a high capability of collecting particulate matter.

(1) An exhaust gas purification filter provided in an exhaust pathway of an internal combustion engine, the exhaust gas purification filter being configured to collect and purify particulate matter in exhaust gas from the internal combustion engine, the exhaust gas purification filter including: a filter base material in which a plurality of cells each extending from an end face on an inflow side for the exhaust gas to an end face on an outflow side are partitioned and formed by partition walls made of a porous material, and at least one cell on the inflow side, where an opening at the end face on the outflow side is sealed, and at least one cell on the outflow side, where an opening at the end face on the inflow side is sealed, are alternately disposed in adjacent positions; and an exhaust gas purification catalyst supported by the partition walls, wherein a wash coating amount of the exhaust gas purification catalyst ranges from 60 g/L to 110 g/L inclusive, the exhaust gas purification catalyst is supported inside the partition walls and by surfaces of the partition walls, when the exhaust gas purification filter is divided into an upstream part, a middle part, and a downstream part from the inflow side to the outflow side, and in each of the upstream part, the middle part, and the downstream part, an average value of a catalyst area ratio on the inflow side and a catalyst area ratio on the outflow side is acquired, the catalyst area ratio on the inflow side being measured at a predetermined location in the cell on the inflow side with a scanning electron microscope (SEM) and representing an area ratio of the exhaust gas purification catalyst supported by the surfaces of the partition walls and the catalyst area ratio on the outflow side being measured at a predetermined location in the cell on the outflow side with the SEM and representing an area ratio of the exhaust gas purification catalyst supported by the surfaces of the partition walls, a minimum value, among the average values, is 28% or greater, and when a median pore size (D50) in the partition walls of each of the upstream part, the middle part, and the downstream part after the exhaust gas purification catalyst is supported is acquired on a volumetric basis, a maximum value thereof is 14.6 μm or less.

With the aspect of the present invention, according to (1), a wash coating amount ranges from 60 g/L or 110 g/L inclusive, how much the exhaust gas purification catalyst is supported in exhaust directions of the cells on the inflow side and the cells on the outflow side is more uniform, and there is less change in the exhaust directions. The inventors and other researchers have unexpectedly found that, according to this configuration, it is possible to improve not only the capability of purifying NOx and other substances, but also the capability of collecting particulate matter.

Furthermore, with the aspect of the present invention, according to (1), a maximum value, among the median pore sizes (D50) among sizes of the pores in the filter base material on a volumetric basis, is smaller, i.e., 14.6 μm or less, expanding a specific surface area, increasing the probability of coming into contact with exhaust gas, and improving the purification capability.

(2) The exhaust gas purification filter described in (1), where the minimum value, among the average values, is 64% or greater.

With the aspect of the present invention, according to (2), it is possible to further improve the capability of collecting particulate matter.

(3) The exhaust gas purification filter described in (1) or (2), where a thickness of each of the partition walls is 11 mil (0.2794 mm) or less.

With the aspect of the present invention, according to (3), it is possible to suppress pressure losses, while improving the capability of collecting particulate matter. Note that 1 mil=0.0254 mm.

(4) The exhaust gas purification filter described in any one of (1) to (3), where a median pore size (D50), among sizes of pores in the partition walls before the exhaust gas purification catalyst is supported, is 12 μm or greater.

With the aspect of the present invention, according to (4), it is possible to suppress pressure losses, while improving the capability of collecting particulate matter.

(5) The exhaust gas purification filter described in any one of (1) to (4), where a size of each of the openings of the cells on the outflow side is smaller than a size of each of the openings of the cells on the inflow side.

With the aspect of the present invention, according to (5), it is possible to suppress pressure losses, while improving the capability of collecting particulate matter.

(6) The exhaust gas purification filter described in any one of (1) to (5), where zeolite is disposed on the exhaust gas purification catalyst supported by the surfaces of the partition walls.

With the aspect of the present invention, according to (6), it is possible to improve the efficiency of reducing hydrocarbon (HC), while improving the capability of collecting particulate matter.

According to the present invention, it is possible to provide an exhaust gas purification filter having a superior capability of collecting particulate matter.

DETAILED DESCRIPTION OF THE INVENTION

An embodiment of the present invention will now be described herein in detail with reference to the accompanying drawings.

<Overall Configuration of Exhaust Gas Purifier>

Figure 1:
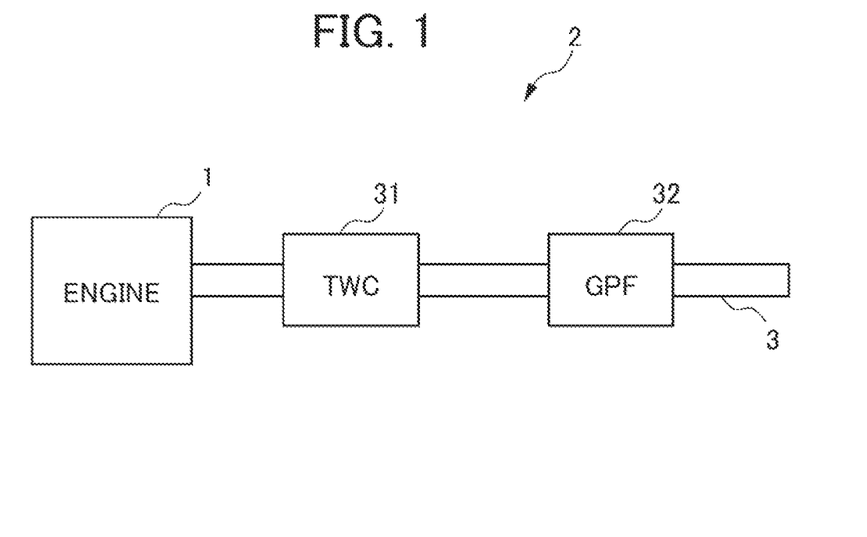
FIG. 1 is a view illustrating a configuration of an exhaust gas purifier for an internal combustion engine, according to an embodiment of the present invention.

FIG. 1 is a view illustrating a configuration of an exhaust gas purifier 2 for an internal combustion engine (hereinafter referred to as "engine") 1, according to the present embodiment. The engine 1 is a direct injection gasoline engine. As illustrated in FIG. 1, the exhaust gas purifier 2 includes a three way catalyst (TWC) 31 and a gasoline particulate filter (GPF) 32 serving as an exhaust gas purification filter, which are provided in order from an upstream side of an exhaust pipe 3 through which exhaust gas passes.

The TWC 31 is configured to purify exhaust gas by oxidizing or reducing HC, CO, and NOx in the exhaust gas respectively into $H_2O$ and $CO_2$, $CO_2$, and $N_2$. As the TWC 31, for example, one is used, in which a carrier made of an oxide of alumina, silica, zirconia, titania, ceria, or zeolite is caused to support a noble metal such as Pd or Rh serving as a catalyst metal. The TWC 31 is typically supported by a honeycomb supporting body.

Furthermore, the TWC 31 contains an oxygen storage capacity (OSC) material having an OSC. As the OSC material, $CeO_2$ or a complex oxide of $CeO_2$ and $ZrO_2$ (hereinafter referred to as "CeZr complex oxide") is used, for example. Among many complex oxides, the CeZr complex oxide is preferably used because it has high durability. Note that such a catalyst metal as described above may be supported by such an OSC material as described above.

A method of preparing the TWC 31 is not particularly limited. The TWC 31 is prepared through a conventionally known slurry process, for example. For example, it is prepared, after slurry containing an oxide, a noble metal, and an OSC material, as described above, is prepared, by causing a honeycomb supporting body made of cordierite to be coated with the prepared slurry and to be fired.

The GPF 32 is configured to collect and purify particulate matter in exhaust gas. Specifically, as exhaust gas passes through fine pores in partition walls described later, particulate matter is accumulated on the surfaces of the partition walls. The particulate matter is thus collected.

Note herein that particulate matter described in the present specification refers to particulate matter (PM) such as soot (carbon soot), oil cinders (soluble organic fraction or SOF), and oil ash (ash), for example. In recent years, emission regulations for such particulate matter have become stricter. That is, such regulations are aimed to regulate not only a total weight of such particulate matter to be discharged (g/km, g/kW) (PM regulations), but also the number of fine particulate matter to be discharged, which have a particle size of 2.5 μm or less, such as PM2.5, (PN regulations), for example. In response to this, the GPF 32 according to the present embodiment is able to satisfy such PM regulations and PN regulations.

Figure 2:
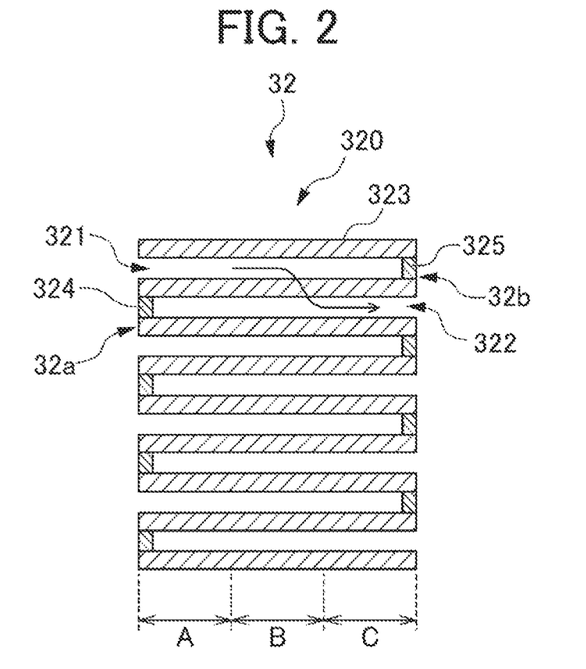
FIG. 2 is a schematic cross-sectional view of a gasoline particulate filter (GPF) according to the embodiment described above.
Figure 3:
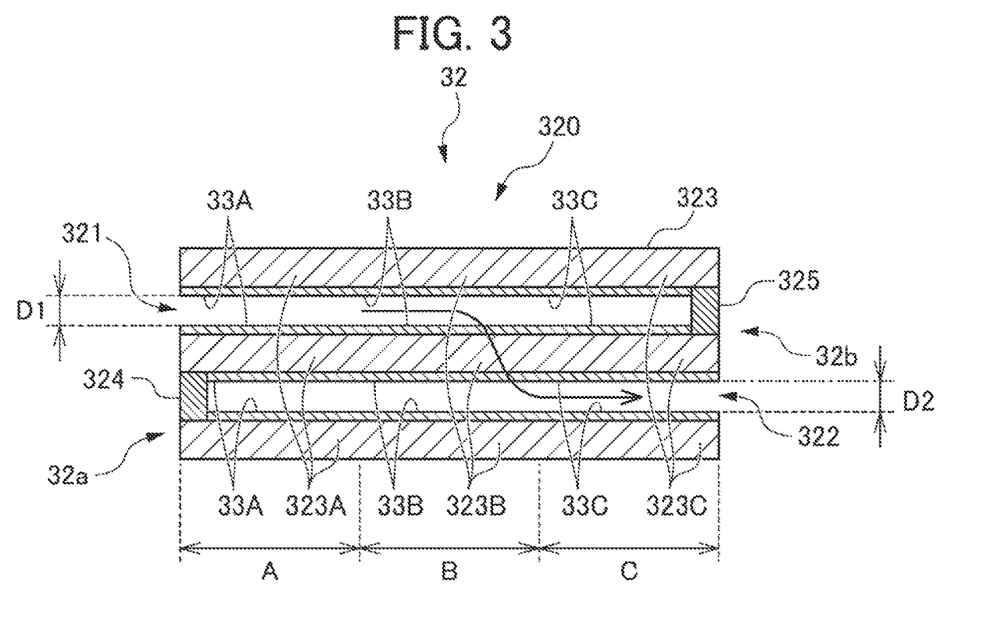
FIG. 3 is an enlarged view of a pair of a cell on an inflow side and a cell on an outflow side in FIG. 2.

FIG. 2 is a schematic cross-sectional view of the GPF 32 according to the present embodiment. FIG. 3 is an enlarged cross-sectional view of a pair of a cell on an inflow side and a cell on an outflow side in FIG. 2.

<Overall Configuration of Exhaust Gas Purification Filter>

As illustrated in FIG. 2, the GPF 32 includes a filter base material 320 and an exhaust gas purification catalyst supported by partition walls 323 of the filter base material 320 (a TWC 33 in the present embodiment).

The filter base material 320 has a columnar shape extending longer in an axial direction, for example. The filter base material 320 is made from a porous body of cordierite, mullite, or silicon carbide (SiC), for example. The filter base material 320 is provided with a plurality of cells each extending from an inflow side end face 32a to an outflow side end face 32b. The cells are partitioned and formed by the partition walls 323.

The filter base material 320 includes inflow side seal parts 324 each sealing an opening at the inflow side end face 32a. Some of the cells, where the openings at the inflow side end faces 32a are sealed by the inflow side seal parts 324, form outflow side cells 322, where inflow side ends are closed, while outflow side ends are opened, causing exhaust gas passed through the partition walls 323 to flow toward downstream. The inflow side seal parts 324 are formed by sealing the inflow side end faces 32a of the filter base material 320 with sealing cement.

The filter base material 320 includes outflow side seal parts 325 each sealing an opening at the outflow side end face 32b. Some of the cells, where the openings at the outflow side end faces 32b are sealed by the outflow side seal parts 325, form inflow side cells 321, where inflow side ends are opened, while outflow side ends are closed, causing exhaust gas to enter from the exhaust pipe 3. The outflow side seal parts 325 are formed by sealing the outflow side end faces 32b of the filter base material 320 with sealing cement.

Due to the openings at the inflow side end faces 32a and the openings at the outflow side end faces 32b of the cells, which are alternately sealed, the inflow side cells 321, where the openings at the outflow side end faces 32b are sealed, and the outflow side cells 322, where the openings at the inflow side end faces 32a are sealed, are alternately disposed.

As arrows in FIG. 2 indicate, exhaust gas, which has entered the inflow side cells 321, enters the partition walls 323, passes through the partition walls 323, and enters the outflow side cells 322. A side to which exhaust gas enters the partition walls 323 refers to an inlet side (inlet). A side from which the exhaust gas exits the partition walls 323 refers to an outlet side (outlet).

<Exhaust Gas Purification Catalyst>

As illustrated in FIG. 3, a three way catalyst, i.e., the TWC 33, is supported by inner surfaces of the partition walls 323 forming the inflow side cells 321 and the outflow side cells 322. It is possible to use, as a three way catalyst, a catalyst such as the TWC 31 described above.

The TWC 33 is configured to purify, similar to the TWC 31 described above, exhaust gas by oxidizing or reducing HC, CO, and NOx in the exhaust gas respectively into $H_2O$ and $CO_2$, $CO_2$, and $N_2$. As the TWC 33, for example, one is used, in which a carrier made of an oxide of alumina, silica, zirconia, titania, ceria, or zeolite is caused to support a noble metal such as Pd or Rh serving as a catalyst metal. Among many noble metals, Pd and Rh are preferable as catalyst metals to be supported. In the present invention, the TWC 33 brings an effect of further collecting particulate matter.

The TWC 33 may contain an oxygen storage capacity (OSC) material (an oxygen absorbing and desorbing material). As the OSC material, $CeO_2$ or a complex oxide of $CeO_2$ and $ZrO_2$ (hereinafter referred to as "CeZr complex oxide") is used, for example. Among many complex oxides, the CeZr complex oxide is preferably used because it has high durability. Note that such a catalyst metal as described above may be supported by such an OSC material as described above. To cause catalyst actions of the TWC described above to simultaneously and effectively occur, it is preferable that a ratio between fuel and air (an air-fuel ratio) is kept closer to a stoichiometric ratio for complete combustion reactions. By using, as a catalytic promoter, together with a catalyst metal, an OSC material having an oxygen absorbing and desorbing capability, with which oxygen is absorbed under an oxidizing atmosphere, while oxygen is desorbed under a reducing atmosphere, it is possible to acquire a catalyst having a higher purification capability.

A method of preparing the TWC 33 is not particularly limited. The TWC 33 is prepared through a conventionally known slurry process, for example. For example, it is prepared, after a slurry containing an oxide, a noble metal, and an OSC material, as described above, is prepared through milling, by causing the filter base material 320 to be coated with the prepared slurry and to be fired.

A wash coating amount of the TWC 33 ranges from 60 g/L or 110 g/L inclusive. It is therefore possible to reduce an increase in pressure loss, and to acquire an effect of collecting particulate matter. Note that the wash coating amount described in the present invention means an amount (g) of an exhaust gas purification catalyst supported by the partition walls 323 per a partition wall volume of 1 L. Note that the exhaust gas purification catalyst, i.e., the TWC 33, is supported by not only the surfaces of the partition walls 323 (in an on-wall manner), but also inside the partition walls 323 (in an in-wall manner).

As illustrated in FIG. 3, the inflow side cells 321 and the outflow side cells 322 of the exhaust gas purification filter 320 are divided into three parts from the inflow side to the outflow side, such as an upstream part A, a middle part B, and a downstream part C, for purposes of convenience. A TWC 33A, a TWC 33B, and a TWC 33C are respectively supported by inner wall surfaces of partition walls 323A, 323B, 323C respectively forming the upstream part A, the middle part B, and the downstream part C.

The upstream part, the middle part, and the downstream part described in the present invention respectively mean substantially three-divided parts in a longer direction of the cells from the inflow side to the outflow side.

The GPF 32 according to the present embodiment, which includes those components described above, is manufactured through a piston pushing-up method, for example. In the piston pushing-up method, a slurry containing constituent materials of an exhaust gas purification catalyst respectively at predetermined amounts is produced through milling. The produced slurry is caused to flow into slurry inflow inlets at the end faces on the inflow side of the filter base material 320 under predetermined conditions through the piston pushing-up method at a predetermined wash coating (WC) amount. The filter base material 320 is thus caused to support the exhaust gas purification catalyst. After drying and firing are performed, the GPF 32 is acquired.

In all the upstream part, the middle part, and the downstream part described in the present invention, one cell on the inflow side and one cell on the outflow side, which lie adjacent to each other, are regarded as a pair, and a catalyst area ratio is measured. That is, an average value (an upstream part average value) for one cell on the inflow side and one cell on the outflow side, which lie adjacent to each other, on the upstream part, an average value (a middle part average value) for one cell on the inflow side and one cell on the outflow side, which lie adjacent to each other, on the middle part, and an average value (a middle part average value) for one cell on the inflow side and one cell on the outflow side, which lie adjacent to each other, on the downstream part are respectively acquired. A minimum value, among the three average values, is regarded as a "minimum value among average values" in the present invention.

More specifically, on inner sides of the partition walls 323A in the upstream part A of the inflow side cells 321, an inflow side catalyst area ratio Ain is acquired by measuring with a scanning electron microscope (SEM) an area ratio of the exhaust gas purification catalyst supported by the surfaces of the partition walls. Next, on inner sides of the partition walls 323A in the upstream part A of the outflow side cells 322, an inflow side catalyst area ratio Aout is acquired by measuring with the SEM an area ratio of the exhaust gas purification catalyst supported by the surfaces of the partition walls. An average value of the both is regarded as an upstream part average value Aave.

Similarly, also in the middle part B, an inflow side catalyst area ratio Bin and an inflow side catalyst area ratio Bout are acquired. An average value of the both is regarded as a middle part average value Bave.

Similarly, also in the downstream part C, an inflow side catalyst area ratio Cin and an inflow side catalyst area ratio Cout are acquired. An average value of the both is regarded as a downstream part average value Cave.

Finally, the upstream part average value Aave, the middle part average value Bave, and the downstream part average value Cave are compared with each other. A minimum value, among the values, is regarded as a minimum value in the present invention. For example, when Aave>Bave>Cave, the downstream part average value Cave is regarded as a minimum value in the present invention. In the present invention, the minimum value is 28% or greater. Therefore, in all the upstream part A, the middle part B, and the downstream part C, area ratios of the exhaust gas purification catalyst supported by the surfaces of the partition walls are higher. It is thus possible to improve not only the capability of purifying NOx and other substances, but also the capability of collecting particulate matter. A minimum value of 30% or greater is preferable, of 40% or greater is more preferable, of 50%- or greater is particularly preferable, of 60% or greater is more particularly preferable, and of 64% or greater is most preferable. The upper limit is not particularly limited, but is 100%.

A possible reason of why it is possible to improve the capability of collecting particulate matter by allowing an area ratio of the catalyst supported by the surfaces of the partition walls to fall within such a range as described above is that no larger holes allowing particulate matter to pass through are exposed on the surfaces of the base material.

Note that it is preferable that the upstream part average value Aave, the middle part average value Bave, and the downstream part average value Cave are all 43% or greater. Furthermore, for at least two or more of the values, 50% or greater is preferable, 60% or greater is more preferable, 70% or greater is particularly preferable, and 80% or greater is most preferable.

In the present invention, it is preferable that "predetermined locations" for measuring area ratios for the cells on the inflow side and the cells on the outflow side represent locations each at an identical distance from respective opening parts of the upstream part A, the middle part B, and the downstream part C. (In the middle part B, there is no actual opening parts. However, it means virtual opening parts at cut sections.)

In the present invention, an "inflow side catalyst area ratio" and an "outflow side catalyst area ratio" refer to area ratios that, when the surface of an exhaust gas purification catalyst is viewed, are measured by binarizing a scanning electron microscopy (SEM) image. Specifically, an ordinary scanning electron microscope (SEM, an electron microscope) is used. Images of two cells on the inflow side and two cells on the outflow side are acquired. Binarization is performed based on contrast differences between the base material and the catalyst in the acquired images. An area of the catalyst actually applied in an area supposed to be applied with catalyst on the plane of the base material, excluding the cut wall surface, is thus determined as an area ratio.

A maximum value, among median pore sizes (D50) among sizes of pores on a volumetric basis in the partition walls forming the upstream part A, the middle part B, and the downstream part C after the exhaust gas purification catalyst is supported, i.e., the partition walls 323A+the TWC 33A, the partition walls 323B+the TWC 33B, and the partition walls 323C+the TWC 33C, is 14.6 μm or less. The median pore sizes (D50), among sizes of the pores in A, B, and C, respectively, are measured at locations in the upstream part A, the middle part B, and the downstream part C, as described above. Specifically, when the median pore sizes (D50), among sizes of the pores, are (the partition walls 323A+the TWC 33A)>(the partition walls 323B+the TWC 33B)>(the partition walls 323C+the TWC 33C), the median pore size (D50), among the sizes of the pores in (the partition walls 323A+the TWC 33A), which indicates the maximum value, is 14.6 μm or less. Preferably, it is 14.0 μm or less. More preferably, it is 13.0 μm or less. Particularly preferably, it is 12.4 μm or less. It is preferable that a lower limit value is 7.5 μm or greater.

A median pore size is measured with an Hg porosimeter. The median pore size represents a pore size when a volume ratio is 50% (D50).

Figure 4:
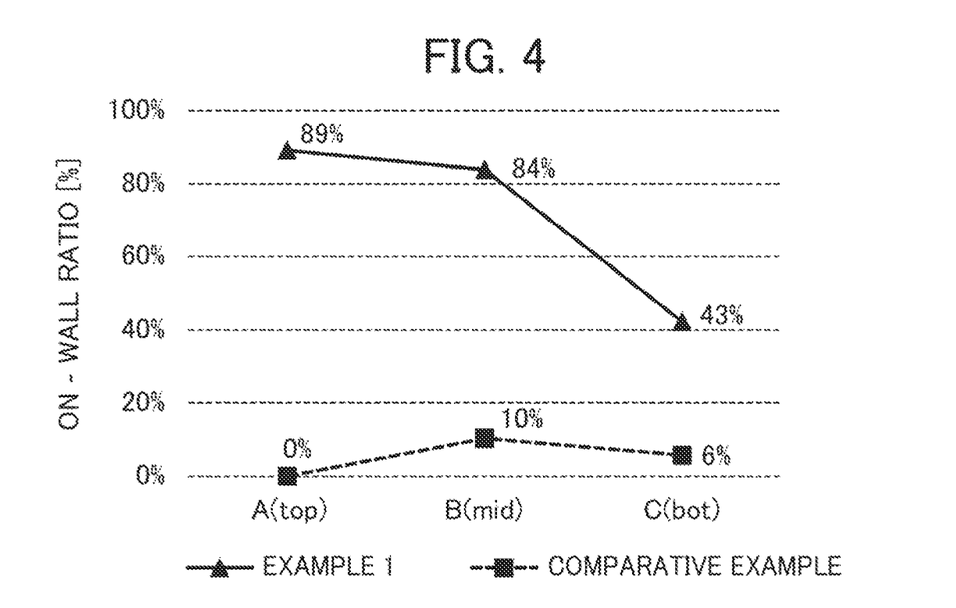
FIG. 4 is a graph of a catalyst area ratio on the inflow side (an on-wall ratio) in the cell on the inflow side, in an example.
Figure 5:
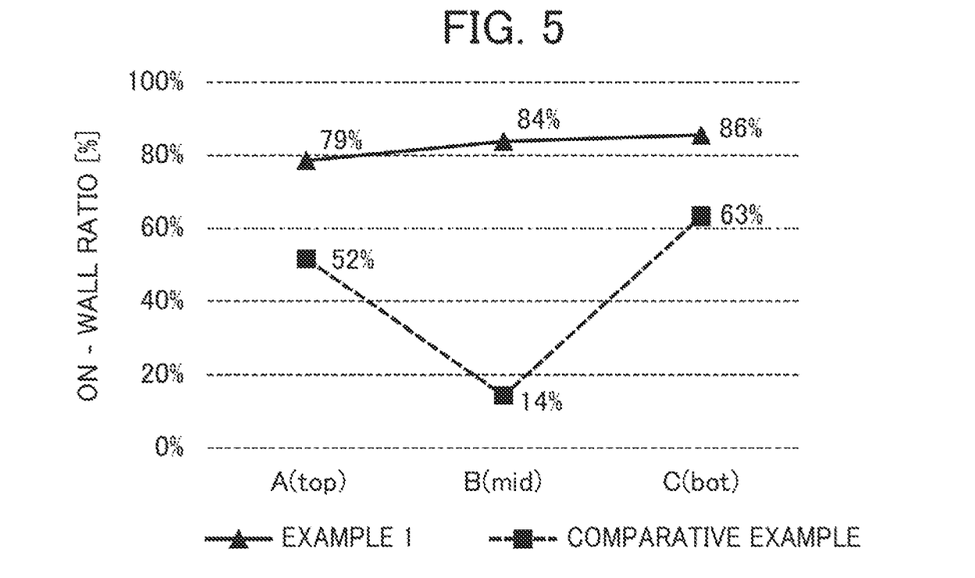
FIG. 5 is a graph of a catalyst area ratio on the outflow side (an on-wall ratio) in the cell on the outflow side, in the example.

FIG. 4 is a graph of inflow side catalyst area ratios (on-wall ratios) measured in the cells on the inflow side, in Example 1 and a comparative example. FIG. 5 is a graph of outflow side catalyst area ratios (on-wall ratios) measured in the cells on the outflow side, in Example 1 and the comparative example (the illustration of Example 2 is omitted). In the drawings, A (top) represents the upstream part A. B (mid) represents the middle part B. C (bot) represents the downstream part C.

Figure 6:
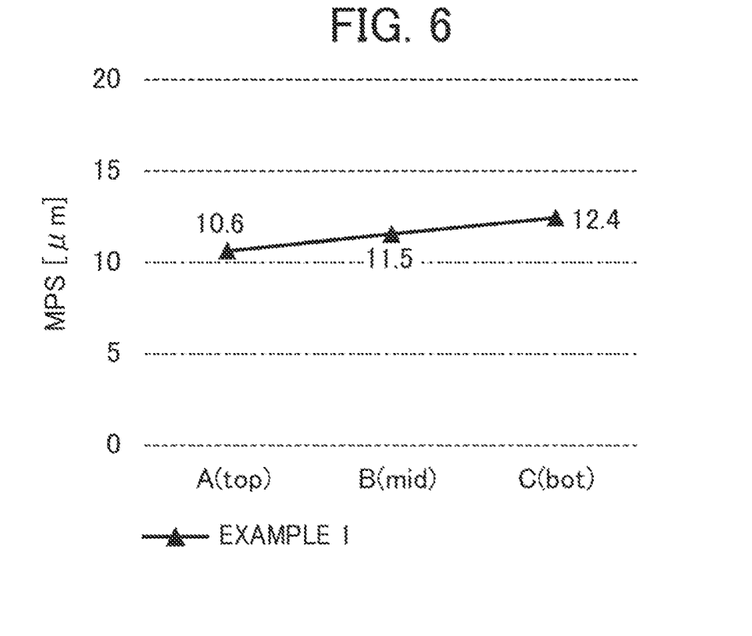
FIG. 6 is a graph of a measured median pore size (D50), among sizes of pores in partition walls after the exhaust gas purification catalyst is supported, in the example.

Furthermore, FIG. 6 is a graph of a measured median pore size (D50), among sizes of pores in the partition walls after the exhaust gas purification catalyst is supported, in Example 1. In the drawing, MPS on the vertical axis stands for a median pore size (D50). The exhaust gas purification catalysts according to the example and the comparative example are produced with the procedure described below. The minimum value among catalyst area ratios (on-wall ratios) described above and the maximum value among median pore sizes (D50) described later are as follows.

Example 1

Aave: 84%
Bave: 84%
Cave: 64%
=>Minimum value among the catalyst area ratios (on-wall ratios) is 64%. Median pore size (D50) among sizes of the pores in the upstream part A: 10.6 μm
Median pore size (D50) among sizes of the pores in the middle part B: 11.5 μm
Median pore size (D50) among sizes of the pores in the downstream part C: 12.4 μm.
=>Maximum value among the median pore sizes (D50) is 12.4 μm.

Example 2

=>Minimum value among the catalyst area ratios (on-wall ratios) is 28%.
=>Maximum value among the median pore sizes (D50) is 14.6 μm.

Comparative Example

=>Minimum value among the catalyst area ratios (on-wall ratios) is 12%.
=>Maximum value among the median pore sizes (D50) is 15.0 μm.

First, an aqueous solution of nitric acid Pd and nitric acid Rh and an $Al_2O_3$ carrier (γ-alumina, commercially available) were loaded into an evaporator to allow Pd and Rh to be impregnated into and supported by the $Al_2O_3$ carrier at a mass ratio of 6/1. Next, after drying was performed, firing was performed at a temperature of 600° C. A Pd—Rh/$Al_2O_3$ catalyst was acquired. Similarly, nitric acid Pd, nitric acid Rh, and $CeO_2$ were prepared. A Pd—Rh/$CeO_2$ catalyst was acquired. For amounts of supported noble metals in both cases, Pd was 1.51% by mass, while Rh was 0.25% by mass.

Next, the Pd—Rh/$Al_2O$, catalyst and the Pd—Rh/$CeO_2$ catalyst were mixed at equal amounts, respectively. Water and a binder were further added and mixed. Milling was performed with a ball mill. A slurry was thus prepared. At a wash coating (WC) amount of 80 g/L, the filter base material was caused to support the TWC described above. After that, while air is allowed to flow, drying was performed at a temperature of 150° C. Firing was then performed at a temperature of 600° C. In the example and the comparative example, respectively, adjustments were performed to allow a catalyst area ratio (an on-wall ratio) and a median pore size to attain those values as described above. The exhaust gas purification filters according to the example and the comparative example were thus acquired.

As a result of measuring the capability of collecting particulate matter with the packing and under the conditions as described below for the exhaust gas purification filters according to the example and the comparative example, relative values, when those values according to the comparative example is set to 1, of 1.23 and 1.12, respectively, were acquired for Example 1 and Example 2. Therefore, it is possible to understand that the example is superior in the capability of collecting particulate matter, compared with the comparative example.

[Test for Collecting Particulate Matter in Actual Vehicles]

For the GPFs according to the example and the comparative example, the GPFs to be tested were respectively installed in vehicles, each at a location behind a 0.6-L three way catalyst located immediately behind a gasoline direct injection engine having a displacement of 1.5 L. The vehicles were driven under the conditions of a room temperature of 25° C. and a humidity of 50%. The numbers of PMs (PNs) were measured at locations in front of and behind the GPFs at that time. Efficiency of collecting the numbers of PMs (PNs) (reduction ratios) was calculated. For measurements, the vehicles were driven for one cycle conforming to the worldwide harmonized light vehicles text procedure (WLTP) as preprocessing. Particulate matter remaining in the GPFs was removed. Soaking was performed for 24 hours at a room temperature of 25° C. Measurements were performed from a cold state to acquire data.

Furthermore, for the capability of purifying NOx, test pieces having undergone aging treatment beforehand were used. Under the conditions of model exhaust gas (NO=500 ppm, $C_3H_6$=1200 ppmC, $H_2$=0.17%, CO=0.5%, $O_2$=0.49%, $CO_2$=14%, $H_2O$=10%, $N_2$ balancing gas, SV=250000/h), 5-min static tests were performed at a temperature of 400° C. Average reduction efficiency for the final one minute was calculated. The values of 78.4%, 80.4%, and 80.3% were acquired respectively for the comparative example, Example 1, and Example 2. It is thus possible to understand that the example is superior in the capability of purifying NOx, compared with the comparative example.

Figure 7:
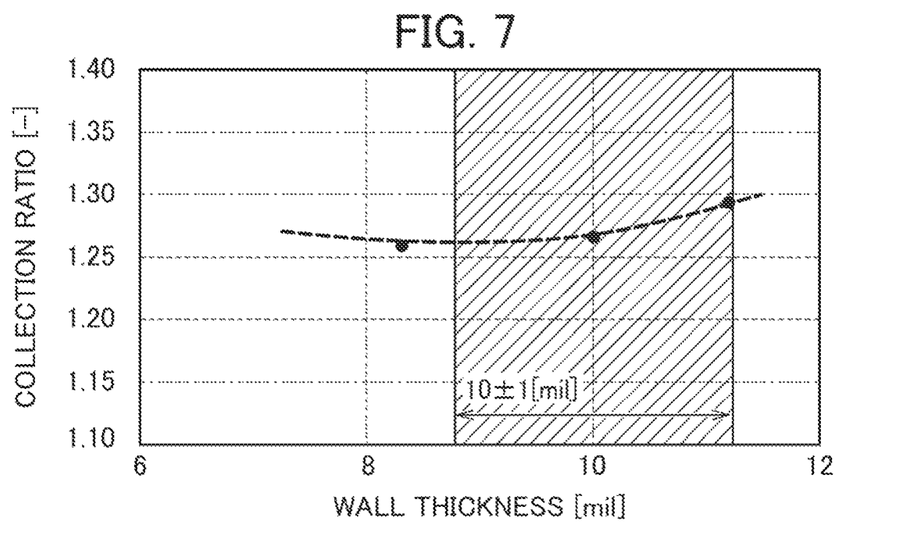
FIG. 7 is a graph illustrating a relationship between a thickness of each of the partition walls and a ratio of collecting particulate matter, in the example.
Figure 8:
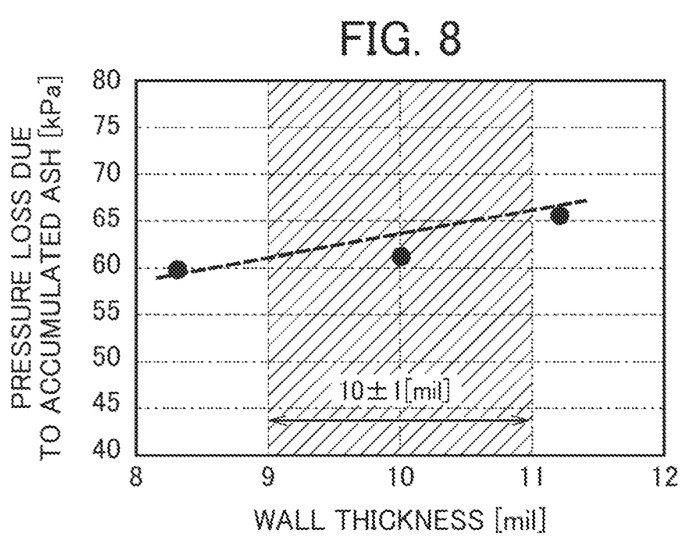
FIG. 8 is a graph illustrating a relationship between the thickness of each of the partition walls and a pressure loss, in the example.

FIG. 7 is a graph illustrating a relationship between a thickness of each of the partition walls and a ratio of collecting particulate matter, in Example 1. FIG. 8 is a graph illustrating a relationship between the thickness of each of the partition walls and a pressure loss, in Example 1. The value of a pressure loss is acquired through the test method as described below. An amount of accumulated ash was 96 g. A measured flow rate was 25 $m^3$/min.

[Pressure Loss]

Pressure losses in the GPFs according to the example and the comparative example were measured with a catalyst carrier pressure loss tester manufactured by Tsukuba Rika Seiki Co., Ltd.

[Ash Volume Pressure Loss]

For the GPFs according to the example and the comparative example, durability tests were performed by using plaster as model ash. Specifically, the plaster was first fired. Milling was performed until a particle size similar to that of actual ash was attained. Next, a self-made suction device (a large-sized dry pump (having a design displacement of 1850 L/minute) was coupled to a tank to perform evacuation) was used. The filter base material was caused to suction the model ash at a predetermined amount to simulate actual driving for the durability tests.

According to FIGS. 7 and 8, the thickness of each of the partition walls ranges from 9 mil to 11 mil inclusive (0.2286 mm to 0.2794 mm inclusive). It is thus possible to understand that there are improvements in both the ratio of collecting particulate matter and pressure loss.

Figure 9:
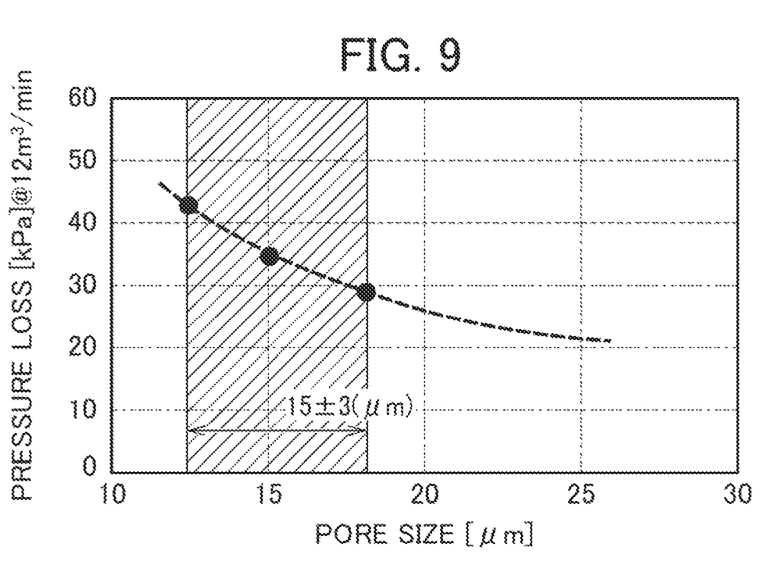
FIG. 9 is a graph illustrating a relationship between a median pore size (D50), among sizes of pores in the partition walls and a pressure loss before the exhaust gas purification catalyst is supported, in the example.

FIG. 9 is a graph illustrating a measured relationship between a median pore size (D50), among sizes of pores in the partition walls, and a pressure loss before the exhaust gas purification catalyst is supported, in Example 1. An amount of accumulated ash was 150 g. A measured flow rate was 12 $m^3$/min.

According to FIG. 9, the median pore size ranges from 12 μm to 18 μm inclusive. It is thus possible to understand that there are improvements in pressure loss.

Figure 10:
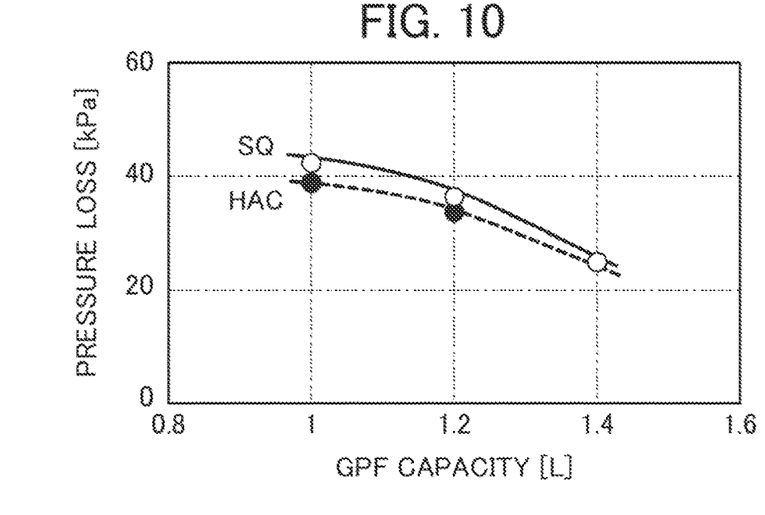
FIG. 10 is a graph illustrating a relationship between a size of an opening of one of the cells and a pressure loss, in the example.

FIG. 10 is a graph illustrating a relationship between the size of the opening of one of the cells and a pressure loss in Example 1. In the drawing, HAC (D1>D2 in FIG. 3) was acquired from Example 1. SQ was acquired from a reference example when a size of an opening of a cell on the inflow side and a size of an opening of a cell on the outflow side were identical to each other (D1=D2 in FIG. 3).

According to FIG. 10, it is possible to understand that there are improvements in pressure loss when D1>D2.

Figure 11:
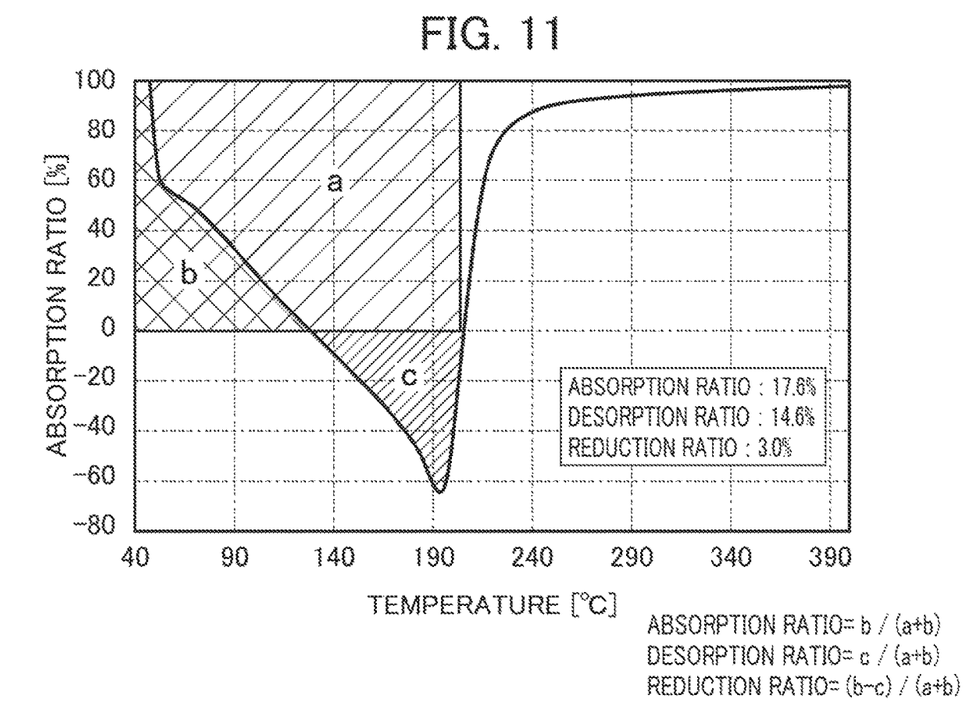
FIG. 11 is a view illustrating the efficiency of reducing HC when zeolite is disposed on the exhaust gas purification catalyst.

FIG. 11 is a view illustrating the efficiency of reducing HC when zeolite is disposed on the exhaust gas purification catalyst according to Example 1. As illustrated in FIG. 11, when zeolite is disposed on the exhaust gas purification catalyst, a ratio of absorbing HC exceeds a ratio of desorbing HC. It is thus possible to understand that there are improvements in the efficiency of reducing HC by a difference of 3.0%.

Note that the present invention is not limited to the embodiment described above. The present invention still includes amendments and modifications, for example, that fall within the scope of the present invention, as long as it is possible to achieve the object of the present invention.

In the embodiment described above, the exhaust gas purification filter according to the present invention has been applied to the GPF. However, the present invention is not limited to the embodiment. The exhaust gas purification filter according to the present invention may be applied to a diesel particulate filter (DPF). In this case, an exhaust gas purification catalyst is not limited to a TWC. Another exhaust gas purification catalyst may be used. For example, it is possible to use an oxidation catalyst such as a PM combustion catalyst.

EXPLANATION OF REFERENCE NUMERALS

1 ENGINE (INTERNAL COMBUSTION ENGINE)
2 EXHAUST GAS PURIFIER
3 EXHAUST PIPE (EXHAUST PATHWAY)
32 GASOLINE PARTICULATE FILTER (GPF, OR EXHAUST GAS PURIFICATION FILTER)
32a INFLOW SIDE END FACE
32b OUTFLOW SIDE END FACE
33, 33A, 33B, 33C THREE WAY CATALYST (TWC, OR EXHAUST GAS PURIFICATION CATALYST)
320 FILTER BASE MATERIAL
323, 323A, 323B, 323C PARTITION WALL
321 INFLOW SIDE CELL
322 OUTFLOW SIDE CELL
324 INFLOW SIDE SEAL PART
325 OUTFLOW SIDE SEAL PART
A: UPSTREAM PART
B: MIDDLE PART
C: DOWNSTREAM PART
D1, D2: OPENING SIZE

What is claimed is:

1. An exhaust gas purification filter provided in an exhaust pathway of an internal combustion engine, the exhaust gas purification filter being configured to collect and purify particulate matter in exhaust gas from the internal combustion engine, the exhaust gas purification filter comprising:
a filter base material in which a plurality of cells each extending from an end face on an inflow side for the exhaust gas to an end face on an outflow side are partitioned and formed by partition walls made of a porous material, and at least one cell on the inflow side, where an opening at the end face on the outflow side is sealed, and at least one cell on the outflow side, where an opening at the end face on the inflow side is sealed, are alternately disposed in adjacent positions; and
an exhaust gas purification catalyst supported by the partition walls,
wherein
a wash coating amount of the exhaust gas purification catalyst ranges from 60 g/L to 110 g/L inclusive,
the exhaust gas purification catalyst is supported inside the partition walls and by surfaces of the partition walls,
when the exhaust gas purification filter is divided into an upstream part, a middle part, and a downstream part from the inflow side to the outflow side, and
in each of the upstream part, the middle part, and the downstream part, an average value of a catalyst area ratio on the inflow side and a catalyst area ratio on the outflow side is acquired,
the catalyst area ratio on the inflow side being measured at a predetermined location in the cell on the inflow side with a scanning electron microscope (SEM) and representing an area ratio of the exhaust gas purification catalyst supported by the surfaces of the partition walls and
the catalyst area ratio on the outflow side being measured at a predetermined location in the cell on the outflow side with the SEM and representing an area ratio of the exhaust gas purification catalyst supported by the surfaces of the partition walls,
a minimum value, among the average values, is 28% or greater, and
when a median pore size (DSO) in the partition walls of each of the upstream part, the middle part, and the downstream part after the exhaust gas purification catalyst is supported is acquired on a volumetric basis, a maximum value thereof is 14.6 μm or less.

2. The exhaust gas purification filter according to claim 1, wherein the minimum value, among the average values, is 64% or greater.

3. The exhaust gas purification filter according to claim 1, wherein a thickness of each of the partition walls is 11 mil or less.

4. The exhaust gas purification filter according to claim 1, wherein a median pore size (D50), among sizes of pores in the partition walls before the exhaust gas purification catalyst is supported, is 12 μm or greater.

5. The exhaust gas purification filter according to claim 1, wherein a size of each of the openings of the cells on the outflow side is smaller than a size of each of the openings of the cells on the inflow side.

6. The exhaust gas purification filter according to claim 1, wherein zeolite is disposed on the exhaust gas purification catalyst supported by the surfaces of the partition walls.

* * * * *